United States Patent [19]

Hohner

[11] Patent Number: 4,793,070
[45] Date of Patent: Dec. 27, 1988

[54] PERFORATION GAUGE FOR POSTAGE STAMPS

[76] Inventor: Horst Hohner, Rossbergstr. 52, D7022 Leinfaleden-Echterdingen 1, Fed. Rep. of Germany

[21] Appl. No.: 69,488

[22] Filed: Jul. 2, 1987

[30] Foreign Application Priority Data

Apr. 18, 1987 [DE] Fed. Rep. of Germany ....... 8705720

[51] Int. Cl.$^4$ .............................................. G01B 5/00
[52] U.S. Cl. ..................................... 33/541; 33/1 BB
[58] Field of Search ................ 33/1 BB, 501, 520, 541

[56] References Cited

U.S. PATENT DOCUMENTS 2,054,697 9/1936 Fiala ........................................ 33/541
2,272,967 2/1942 Desmond ............................... 33/541
4,217,697 8/1980 Schneider .............................. 33/541

Primary Examiner—William D. Martin, Jr.
Attorney, Agent, or Firm—Fred Philpitt

[57] ABSTRACT

A measuring plate (10) supports successive rows of perforation fingers (24i–k) on its upper side, the spacing and diameter of which respectively correspond to the perforations of a postage stamp. By laying the postage stamp on a row of perforation fingers (22i), the conformity of the postage stamp perforations and measuring perforations can be checked in a tactile manner. The measuring plate (10) is connected by way of a hinge (30 to 34) to a trough-like lid member (12), which can be used for checking water-marks. The measuring plate (10) and lid member (12) together form a flat carrying case for postage stamps.

14 Claims, 2 Drawing Sheets

PERFORATION GAUGE FOR POSTAGE STAMPS

DESCRIPTION

The invention relates to a perforation gauge.

In known perforation gauges, dots are printed on a transparent base material, the spacing of which dots corresponds to the perforation spacing and the diameter of which corresponds to the diameter of the punched holes forming the perforation of the sheet of stamps. However, an optical comparison between the perforations of a postage stamp and the various patterns of the perforation gauge is frequently difficult, if the individual perorations differ only slightly, for example if the perforation 14¾ is to be distinguished from the perforation 14½.

The present invention therefore intends to provide a perforation gauge which allows a more rapid and reliable identification of the perforation, but at the same time has compact dimensions.

This object is achieved according to the invention by a perforation gauge as described hereinafter.

The perforation gauge according to the invention is used in that one presses the perforations of the postage stamp to be measured against one of the rows of perforation fingers, the "engagement" of the postage stamp perforations on a row of perforation fingers being able to be detected satisfactorily in a tactile manner. In addition, the conformity can also be perceived satisfactorily in an optical manner, since an overlap between the postage stamp perforations and the comparison perforation, as is possible in the case of printed comparison patterns, is precluded in the perforation gauge according to the invention.

The development of the invention according to one embodiment facilitates the systematic location of the matching row of perforation fingers.

The development of the invention according to another embodiment ensures that the peroration gauge can be inserted in a jacket pocket without any risk of damage to the fabric by the perforation fingers.

The development of the invention according to still another embodiment is also an advantage with regard to carrying the perforation gauge in a jacket pocket in a manner which protects the fabric.

The development of the invention according to a further embodiment ensures that the lid member serving for covering the perforation gauge can at the same time be used as a flat trough for testing water-marks using petrol or the like. In addition, the lid member and base plate together form a small flat case, in which a few postage stamps can be carried to or brought back from exchange centres.

In a perforation gauge according to another embodiment, the lid member and measuring plate are undetachably connected to each other and the lid member can be moved very simple between its inoperative position and its operative position.

With the development of the invention according to another embodiment it is ensured that the trough-like lid member is supported in a stable manner in its open position on a flat support surface. Even if a force directed perpendicularly to the support surface is exerted on the lid member or the measuring plate, when the perforation gauge is opened out, the trough-like lid member cannot tip over accidentally due to this.

In a perforation gauge according to another embodiment, the lid member and the measuring plate together form a flat unit similar to a pencil case, the measuring plate with the perforation fingers engaging inside the lid member in the inoperative position, whereas by turning the measuring plate over, the working position with the perforation fingers pointing outwards can be adjusted. Even in this working position, the measuring plate and lid member together form a closed case, in which postage stamps carried along for exchange purposes can be reliably located.

The development of the invention according to another embodiment ensures that the surface sections of the measuring plate lying between the rows of perforation fingers are still located above raised symbols, which are provided in edge regions of the measuring plate located beside the measuring panel. Thus, these raised symbols do not impair the sliding of the perforations of the postage stamps on the individual rows of perforation fingers.

With the development of the invention according to another embodiment, optical checking of the conformity between the perforation and the row of perforation fingers is facilitated.

With the development of the invention according to another embodiment one can made the symbols with which the individual perforations are provided visible in exactly the same way as the perforation fingers are made visible due to the fact that an inked roller is moved across the measuring plate.

A perforation gauge with the dimensions according to another embodiment can fit comfortably in a jacket pocket, the measuring plate being sufficiently large in order to be able to locate current postage stamp perforations, with adequate spacing of the rows of perforation fingers, on the latter.

With the development of the invention according to another embodiment, it is possible to convey a few stamps safely and so that they can be easily shown, in the flat case formed by the lid member and measuring plate.

The invention will be described in detail hereafter by means of embodiments, referring to the drawings, in which.

Figure 1:
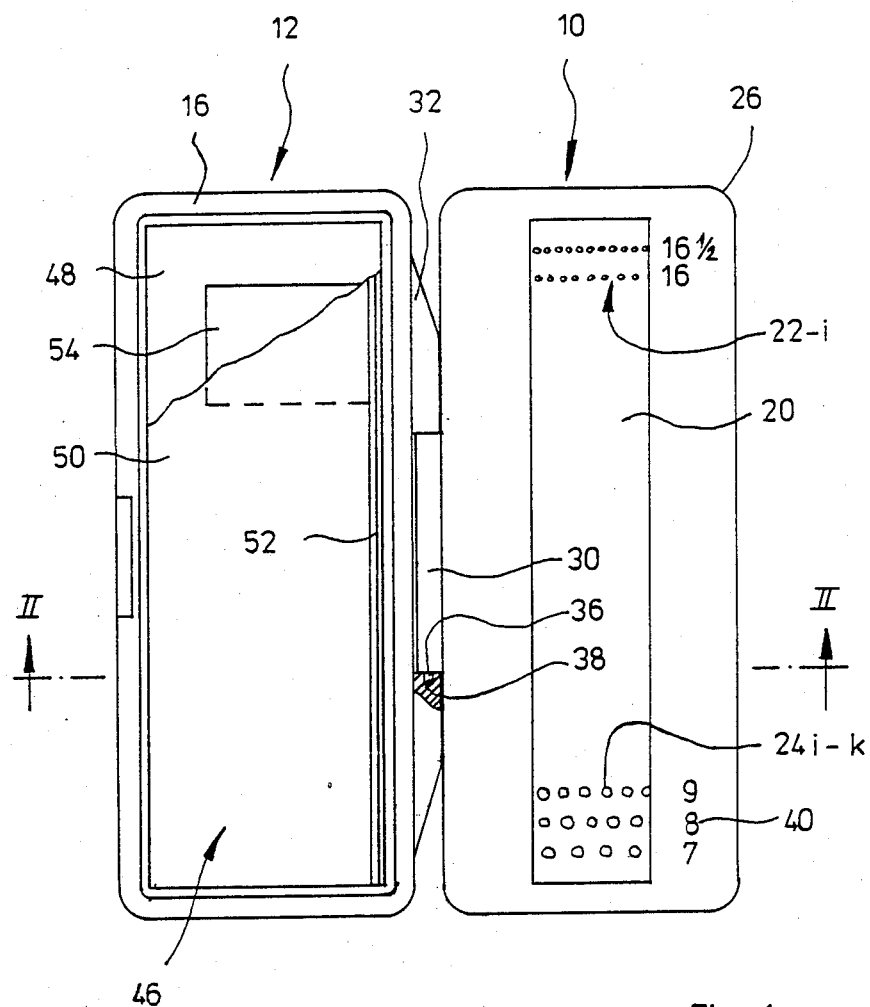
FIG. 1 is a plan view of an open case, which can be used for conveying postage stamps, for measuring the perforations of postage stamps and for checking the water-mark of postage stamps.
Figure 2:
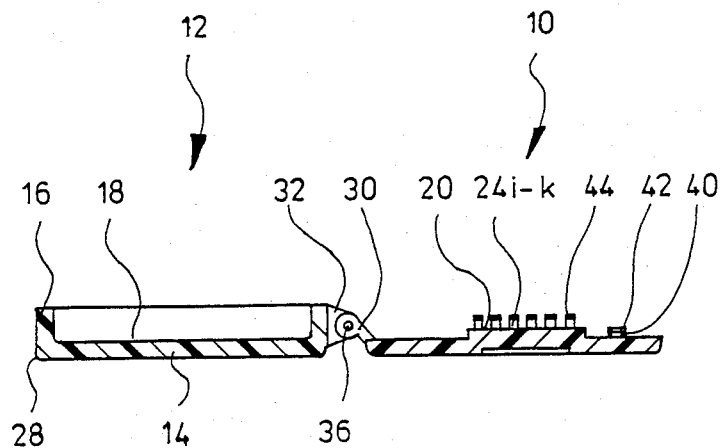
FIG. 2 is a section through the case illustrated in FIG. 1, along the section line II—II.

The case illustrated in FIGS. 1 and 2 consists of a measuring plate designated generally by the reference numeral 10 and of a lid member 12.

The lid member 12 has a bottom wall 14 and a relatively low peripheral wall 16 and thus defines a flat trough 18. The lid member 12 is injection moulded from a synthetic material which is resistant to petrol, so that postage stamps can be placed in the trough 18 in order to make the water-mark visible by applying a few drops of petrol for cleaning.

The measuring plate 10 has a raised plate section 20, which seen in plan view, is in the shape of an elongated rectangle. Rows 22$i$ of perforation fingers 24$i$–$k$ are arranged on the plate section 20. The perforation fingers 24$i$–$k$ are each in the form of short, cylindrical pegs, within one row the spacing of the perforation fingers being constant and the diameter of the perforation fingers being adapted to the perforation associated with the row.

Twenty rows of perforation fingers are provided typically on the plate section for the following perforations: 7, 8, 9, 9½, 10, 10¼, 10½, 10¾, 11, 11¼, 11½, 11¾, 12, 12¼, 12½, 12¾, 13, 13¼, 13½, 13¾, 14, 14¼, 14½, 14¾, 15, 15½, 16 and 16½.

In a practical embodiment, the rows 22i of perforation fingers follow each other at a spacing of 4 mm and they each have a length of 20 mm. One thus has an adequate number of engagement points between the perorations of a postage stamp to be measured and the perforation fingers forming one row.

Due to the fact that one presses the postage stamp perforations lightly against a row 22i of perforation fingers, it is easy to check in a tactile manner and visually whether the postage stamp perforations correspond exactly to the spacing of the row of perforation fingers in question.

With the above-mentioned perforations and the above-mentioned spacing of the rows 22i of perforation fingers, seen in plan view, the measuring plate 10 may be in the form of a rectangle with edge lengths of 115 mm respectively 50 mm. The lid member 12 also has corresponding dimensions, it peripheral wall 16 may in practice have a height of 5 mm.

The corners of the measuring plate 10 and lid member 12 are rounded, as shown at 26. The outer edges of the measuring plate 10 and lid member 12 are likewise rounded, as shown at 28. Thus, the measuring plate 10 and the lid member 12 together form a compact case having smooth surfaces and free of corners, when the lid member 12 is completely folded over onto the measuring plate 10.

The connection between the lid member 12 and measuring plate 10 takes place by way of a hinge, to which a hinge part 30 attached to the measuring plate 10 as well as hinge parts 32, 34 attached to the lid member 12 belong.

As shown in FIG. 2, the hinge part 30 is offset so that the lid member 12 and measuring plate 10 lie with their undersides in the same plane, when the case formed by them is completely open. Then, even if one exerts a force directed perpendicularly to the support surface on the measuring plate 10 in the vicinity of the hinge, this cannot lead to tilting of the lid member; the same is true for the exertion of normal forces on the lid member 12.

The hinge parts 30 to 34 are held together by a snap fit, for which purpose the hinge part 30 is provided at its ends with short projecting hinge pins 36, which engage in matching hinge bores 38 in the hinge parts 32, 34.

Numerals 40, which indicate the perforation associated with a row 22i of perforation fingers, are provided as raised, projecting symbols on the right-hand edge section of the measuring plate 10. The end face of this raised symbol 40 is made to contrast as regards colour with the measuring plate 10 by a layer of colour 42 which is rolled on. A layer of colour 44 is also rolled respectively onto the free end faces of the perforation fingers 24i-k in a corresponding manner.

As shown in FIG. 2, the height of the raised symbols 40 is adapted to the height of the plate section 20 so that the end face of the symbol 40 does not project beyond the plate section 20.

A storage sheet 46 is inserted substantially in a form-locking manner in the trough 18. It consists of a lower sheet 48, which is generally made from an opaque material, and of a transparent covering sheet 50. The covering sheet 50 is connected to the lower sheet 48 by a heat-sealing seam 52 lying close to one of the longitudinal side edges, so that postage stamps 54 are held in the vicinity of the heat-sealed seam 52 with a tight fit between the lower sheet 48 and the cover sheet 50. Since the storage sheet 46 itself cannot carry out any appreciable movements within the lid member 12, postage stamps can in this way be conveyed very carefully in the flat case fitting into a jacket pocket, which is formed by the measuring plate 10 and the lid member 12, when closed.

The above-described case thus simultaneously fulfills three functions: measuring of the perforations of a postage stamp with high accuracy, making the water-mark of postage stamps visible and careful transportation of small quantities of postage stamps. Thus overall the case has very compact dimensions and fits easily like a pocket comb in a jacket pocket.

Figure 3:
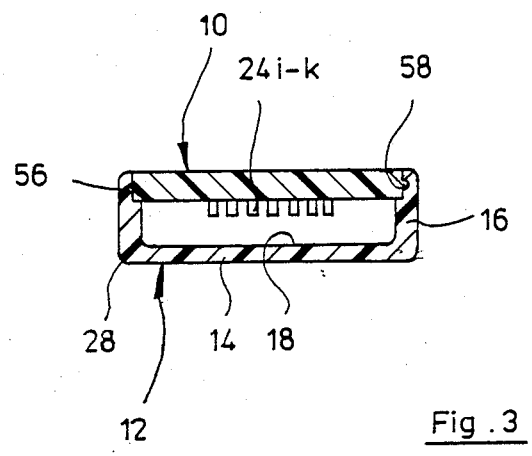
FIG. 3 is a cross section through a modified case for carrying postage stamps, measuring perforations and revealing the water-mark of postage stamps, in the closed state.

In the modified embodiment according to FIG. 3, parts which were described above with reference to FIGS. 1 and 2, are again provided with the same reference numerals.

On its side edges, the measuring plate 10 now has an attached tongue 56, which fits in a complementary groove 58 in the upper edge of the longitudinal or transverse walls of the lid member 12. The measuring plate 10 and the lid member 12 together thus form a unit which is similar to a pencil case, but somewhat flatter. FIG. 3 shows the measuring plate 10 in its inoperative position, in which the perforation fingers 24i-k project into the trough 18. If one removes the measuring plate 10 from the lid member 12, it can then be slid back in reverse orientation over the trough 18, so that now the perforation fingers 24i-k project outwards and can be used for measuring postage stamps. In this working position also, the trough 18 is closed, so that postage stamps stored therein cannot be lost.

I claim:
1. Perforation gauge for postage stamps comprising a measuring plate (10) which supports an elongated, rectangular panel (20) filled with a plurality of parallel rows (22i) of elongated perforation fingers (24i-k), the spacing of the perforation fingers within one row being constant and the transverse dimension of the perforation fingers being coordinated with this spacing, while the spacing of the perforation fingers varies from row to row, characterized by a lid member (12) which in its inoperative position covers the side of the measuring plate (10) supporting the perforation fingers (24i-k) and exposes the latter in its working position, and in its closed position the lid member (12) together with the measuring plate (10) defines a body with smooth outer surfaces.

2. Perforation gauge according to claim 1 characterized in that the spacing of the perforation fingers (24i-k) varies in the same direction from row to row.

3. Perforation gauge according to claim 1 characterized in the the edges and corners of the measuring plate (10) and the lid member (12) are rounded (26, 28).

4. Perforation gauge according to claim 2 characterized in that the lid member (12) comprises a bottom wall (14) and a relatively low peripheral wall (16) and thus defines a flat trough (18).

5. Perforation gauge according to claim 4 characterized in that the lid member (12) is made from a material which is resistant to hydrocarbon compounds.

6. Perforation gauge according to claim 2 characterized in that the lid member (12) is connected to the measuring plate (10) by way of a hinge (30 to 34).

7. Perforation gauge according to claim 6 characterized in that at lest one (30) of the hinge parts (30 to 34) is offset so that when fully open, the undersides of the lid member (12) and measuring plate (10) lie in a common plane.

8. Perforation gauge according to claim 2 characterized in that the measuring plate (10) cooperates with the lid member (12) by way of a tongue and groove arrangement (56, 58).

9. Perforation gauge according to claim 2 characterized in that the measuring plate (10) cooperates with the lid member (12) by way of a catch arrangement (56 to 58).

10. Perforation gauge according to claim 1 characterized in that the perforation fingers (24i–k) are carried by a raised surface section (20) of the measuring plate (10).

11. Perforation gauge according to claim 1 characterized in that the free end faces of the perforation fingers (24i–k) bear a layer of color (44) which contrasts with the color of the material from which the measuring plate (10) is made.

12. Perforation gauge according to claim 11 characterized in that inscriptions (40) belonging to the rows (22i) of perforation fingers consist of raised symbols and their free end faces likewise bear a layer (42) of a contrasting color.

13. Perforation gauge according to claim 1 characterized in that the measuring plate has a length of approximately 11 cm and a width of approximately 4 to 6 cm and the rows (22i) of perforation fingers follow each other with a spacing of approximately 4 mm.

14. Perforation gauge according to claim 4 characterized in that a storage sheet (46) is inserted essentially in a form-locking manner in the lid member (12), which storage sheet comprises an undersheet (48) and a transparent cover sheet (50) that are connected to each other.

* * * * *